US006769052B2

(12) United States Patent
Chauvel et al.

(10) Patent No.: US 6,769,052 B2
(45) Date of Patent: Jul. 27, 2004

(54) CACHE WITH SELECTIVE WRITE ALLOCATION

(75) Inventors: Gerard Chauvel, Antibes (FR); Maija Kuusela, Mouans Sartoux (FR); Dominique D'Inverno, Villeneuve-Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 183 days.

(21) Appl. No.: 10/157,555

(22) Filed: May 29, 2002

(65) Prior Publication Data

US 2003/0101320 A1 May 29, 2003

(30) Foreign Application Priority Data

Oct. 17, 2001 (EP) .......................................... 01402685

(51) Int. Cl.[7] .......................... G06F 12/00; G06F 12/08
(52) U.S. Cl. ...................... 711/154; 711/133; 711/135; 711/138
(58) Field of Search ............................... 711/154, 133, 711/135, 138

(56) References Cited

U.S. PATENT DOCUMENTS

| | | | |
|---|---|---|---|
| 5,355,467 A | * 10/1994 | MacWilliams et al. | 711/146 |
| 5,359,723 A | * 10/1994 | Mathews et al. | 711/122 |
| 5,584,017 A | * 12/1996 | Pierce et al. | 711/146 |
| 5,689,679 A | 11/1997 | Jouppi | |
| 5,796,980 A | * 8/1998 | Bowles | 711/144 |
| 6,289,413 B1 | * 9/2001 | Rogers et al. | 711/105 |
| 6,360,298 B1 | * 3/2002 | Osanai et al. | 711/133 |

* cited by examiner

Primary Examiner—Hiep T. Nguyen
(74) Attorney, Agent, or Firm—Robert D. Marshall, Jr.; W. James Brady, III; Frederick J. Telecky, Jr.

(57) ABSTRACT

A digital system and method of operation is provided in which several processors (590n) are connected to a shared cache memory resource (500). A translation lookaside buffer (TLB) (310n) is connected to receive a request virtual address from each respective processor. A set of address regions (pages) is defined within an address space of a back-up memory associated with the cache and write allocation in the cache is defined on a page basis. Each TLB has a set of entries that correspond to pages of address space and each entry provides a write allocate attribute (550) for the associated page of address space. During operation of the system, software programs are executed and memory transactions are performed. A write allocate attribute signal (550) is provided with each write transaction request. In this manner, the attribute signal is responsive to the value of the write allocation attribute bit assigned to an address region that includes the address of the write transaction request. Write allocation in the cache memory is performed generally in accordance with the write allocate attribute signal. However, write allocation policy circuitry (560) is also provided and operates to refine the operation of the write allocation. Thus, the cache memory is responsive to the write policy circuitry such that write allocation is performed in a selective manner in accordance to the attribute signal for a first write policy state and write allocation is always performed in accordance to the attribute signal for a second write policy state.

11 Claims, 9 Drawing Sheets

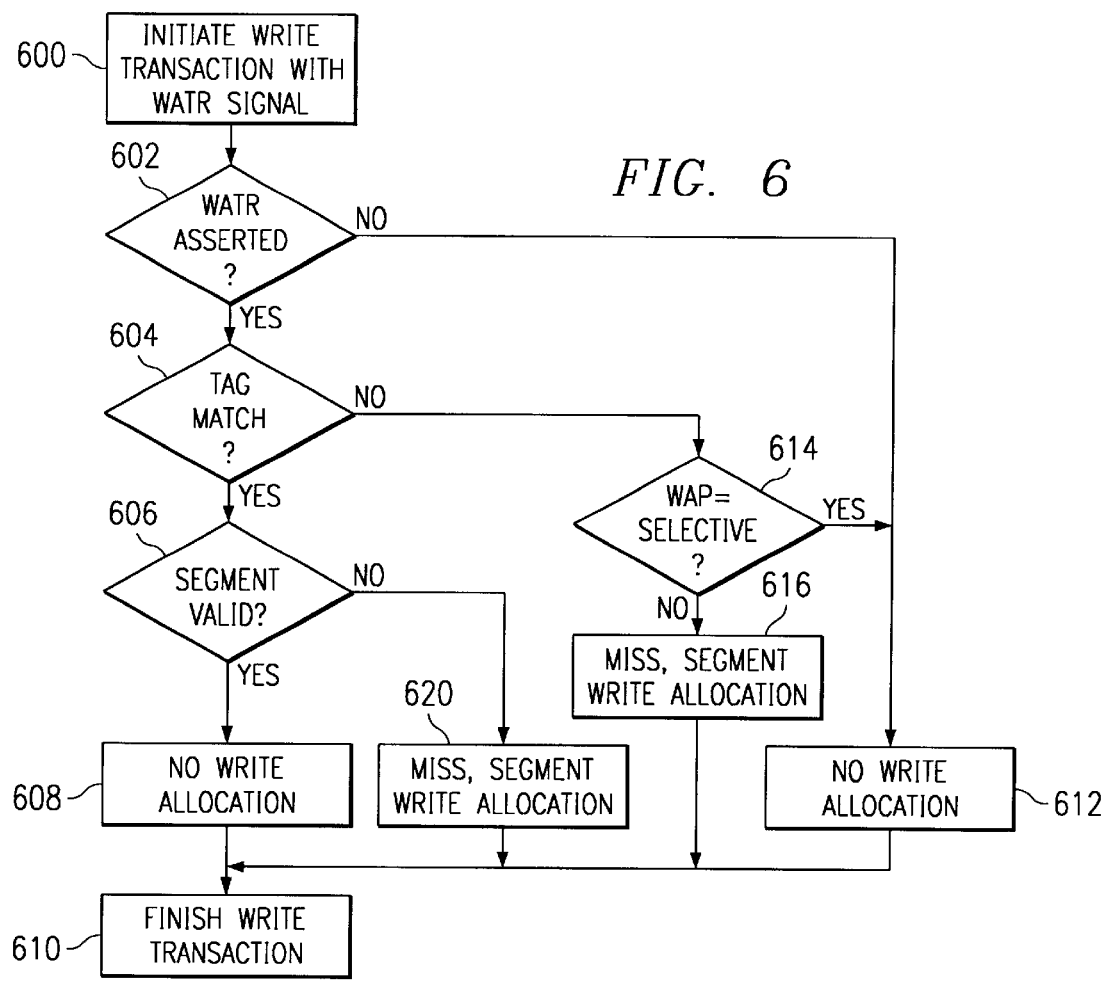
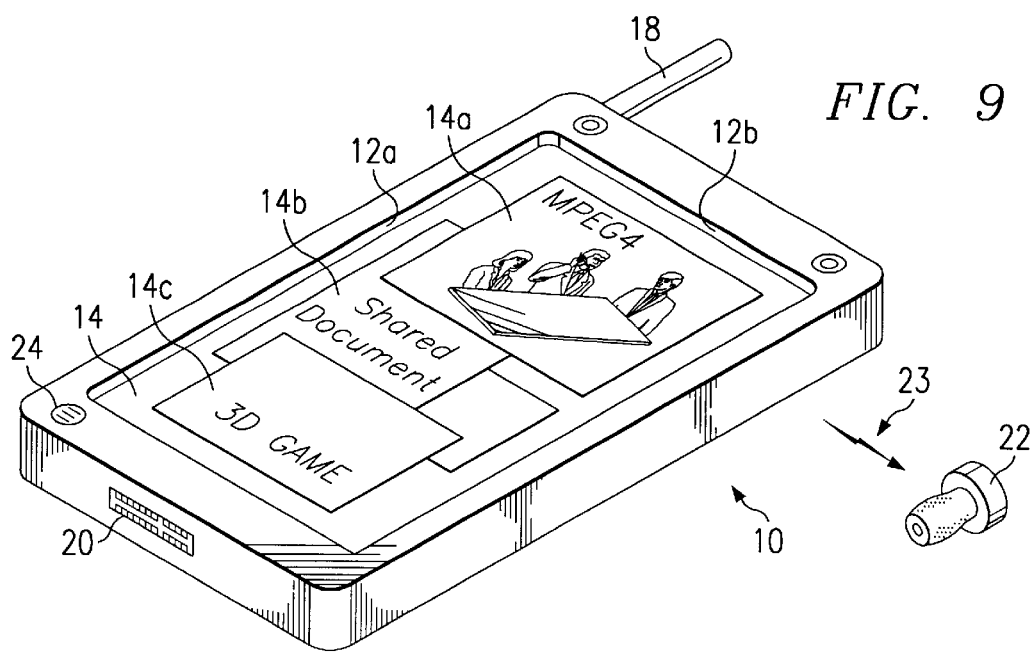

CACHE WITH SELECTIVE WRITE ALLOCATION

This application claims priority to European Application Serial No. 01402685.0, filed Oct. 17, 2001. U.S. patent application Ser. No. 09/932,651 is incorporated herein by reference.

FIELD OF THE INVENTION

This invention generally relates to microprocessors, and more specifically to improvements in access and data transfer to cache storage resources, systems, and methods of making.

BACKGROUND

Microprocessors are general-purpose processors that provide high instruction throughputs in order to execute software running thereon, and can have a wide range of processing requirements depending on the particular software applications involved.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever-increasing DSP performance while keeping power consumption as low as possible.

To further improve performance of a digital system, two or more processors can be interconnected. For example, a DSP may be interconnected with a general-purpose processor in a digital system. The DSP performs numeric intensive signal processing algorithms while the general-purpose processor manages overall control flow. The two processors communicate and transfer data for signal processing via shared memory. A direct memory access (DMA) controller is often associated with a processor in order to take over the burden of transferring blocks of data from one memory or peripheral resource to another and to thereby improve the performance of the processor.

A shared cache can also be associated with the shared memory to improve storage access time for each of the processors. Various caches handle write transactions in different manners. A first embodiment of a cache performs write through, in which data is written directly to backing memory. If the address was also present in the cache, a hit, the cache is updated. A second embodiment of a cache performs write allocation. In this case, if a write address misses in the cache, then a cache line is allocated to receive the data being written. A third embodiment of a cache performs copy-back. In this case, data is not immediately written directly to backing memory, but is first written only to the cache using write allocation. A dirty bit is set to indicate incoherent cache data. When the line is evicted, then the dirty data is written to backing memory.

Modular programming builds a computer program by combining independently executable units of computer code (known as modules), and by tying modules together with additional computer code. Features and functionality that may not be provided by a single module may be added to a computer program by using additional modules.

The design of a computer program unit known as a task (or function) is often accomplished through modular programming, where a specific task is comprised of one module and the additional computer code needed to complete the task (if any additional code is needed). However, a task may be defined as broadly as a grouping of modules and additional computer codes, or, as narrowly as a single assembly-type stepwise command. A computer program may be processed (also called "run" or "executed") in a variety of manners. In task processing, a computer may process computer code one task at a time, or may process multiple tasks simultaneously, for example.

Various tasks may operate on a set of data stored in memory. The various tasks may be executed on various processors that have shared access to the memory and cache. Accordingly, there is needed a system and method for managing a shared cache taking into account resource capabilities and capacity, and other task processing needs.

SUMMARY OF THE INVENTION

Particular and preferred aspects of the invention are set out in the accompanying independent and dependent claims. In accordance with a first embodiment of the invention, a method is provided for operating a digital system that has a shared cache memory and an associated back-up memory. During operation of the system, a write allocation policy is established, software programs are executed and memory transactions are performed. According to an aspect of the present invention, a write transaction request is initiated to an address in the back-up memory and an attribute signal is provided with the write transaction request. Write allocation in the cache memory is performed in a selective manner in response to the attribute signal in accordance with the write allocation policy.

In another embodiment, write allocation in the cache is responsive to the write allocate policy such that write allocation is performed in a selective manner in accordance to the attribute signal for a first write policy state and write allocation is always performed in accordance to the attribute signal for a second write policy state.

In another embodiment, write allocation in the cache is defined on a page basis. A set of address regions (pages) is defined within an address space of the back-up memory. A write allocation attribute bit value is assigned to each of at least a portion of the set of address ranges. In this manner, the attribute signal is responsive to the value of the write allocation attribute bit assigned to an address region that includes the address of the write transaction request.

Advantageously, the usage of a shared cache in a multi-processor system can be optimized by controlling write allocation on a page by page basis and refined in accordance with a write allocation policy in order to improve performance of tasks operating on the various processors of the system and to also reduce power consumption. Advantageously, the write attribute policy can be changed over time based on a currently executing task or on other factors known to the OS, for example.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 1 and in which:

FIG. 6 is a flow chart illustrating operation of selective write allocation, according to aspects of the present invention;

FIG. 9 is a representation of a telecommunications device incorporating an embodiment of the present invention.

Corresponding numerals and symbols in the different figures and tables refer to corresponding parts unless otherwise indicated.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
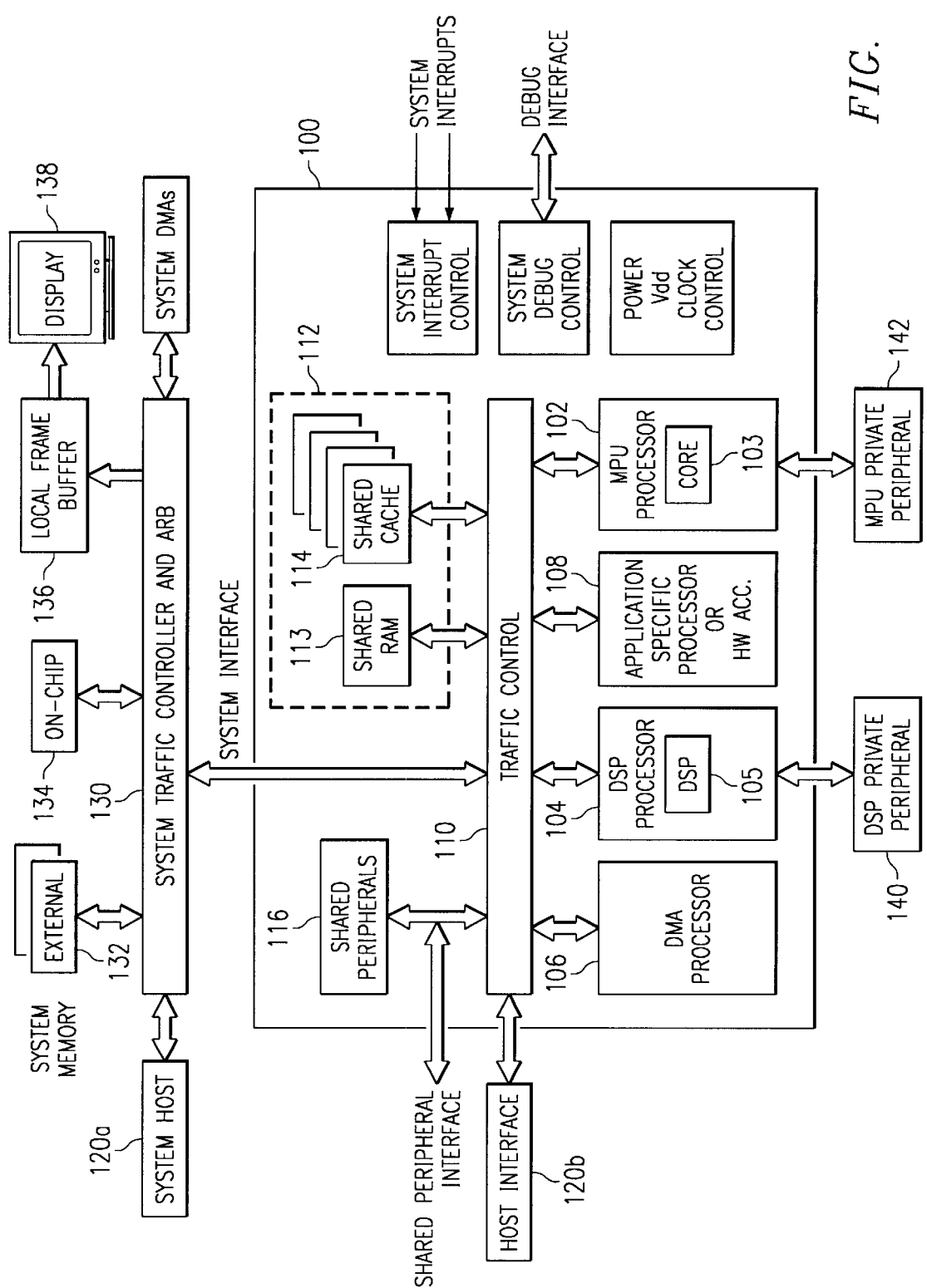
FIG. 1 is a block diagram of a digital system that includes an embodiment of the present invention in a megacell core having multiple processor cores.

FIG. 1 is a block diagram of a digital system that includes an embodiment of the present invention in a megacell core 100 having multiple processor cores. In the interest of clarity, FIG. 1 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Referring again to FIG. 1, megacell 100 includes a control processor (MPU) 102 with a 32-bit core 103 and a digital signal processor (DSP) 104 with a DSP core 105 that share a block of memory 113 and a cache 114, that are referred to as a level two (L2) memory subsystem 112. A traffic control block 110 receives transfer requests from a host processor connected to host interface 120b, requests from control processor 102, and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

External to the megacell, a level three (L3) control block 130 is connected to receive memory requests from internal traffic control block 110 in response to explicit requests from the DSP or MPU, or from misses in shared cache 114. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. A host processor 120a interacts with the external resources a system traffic controller 130. A host interface connected to traffic controller 130 allows access by host 120a to external memories and other devices connected to traffic controller 130. Thus, a host processor can be connected at level three or at level two in various embodiments. A set of private peripherals 140 are connected to the DSP, while another set of private peripherals 142 are connected to the MPU.

Figure 2A:
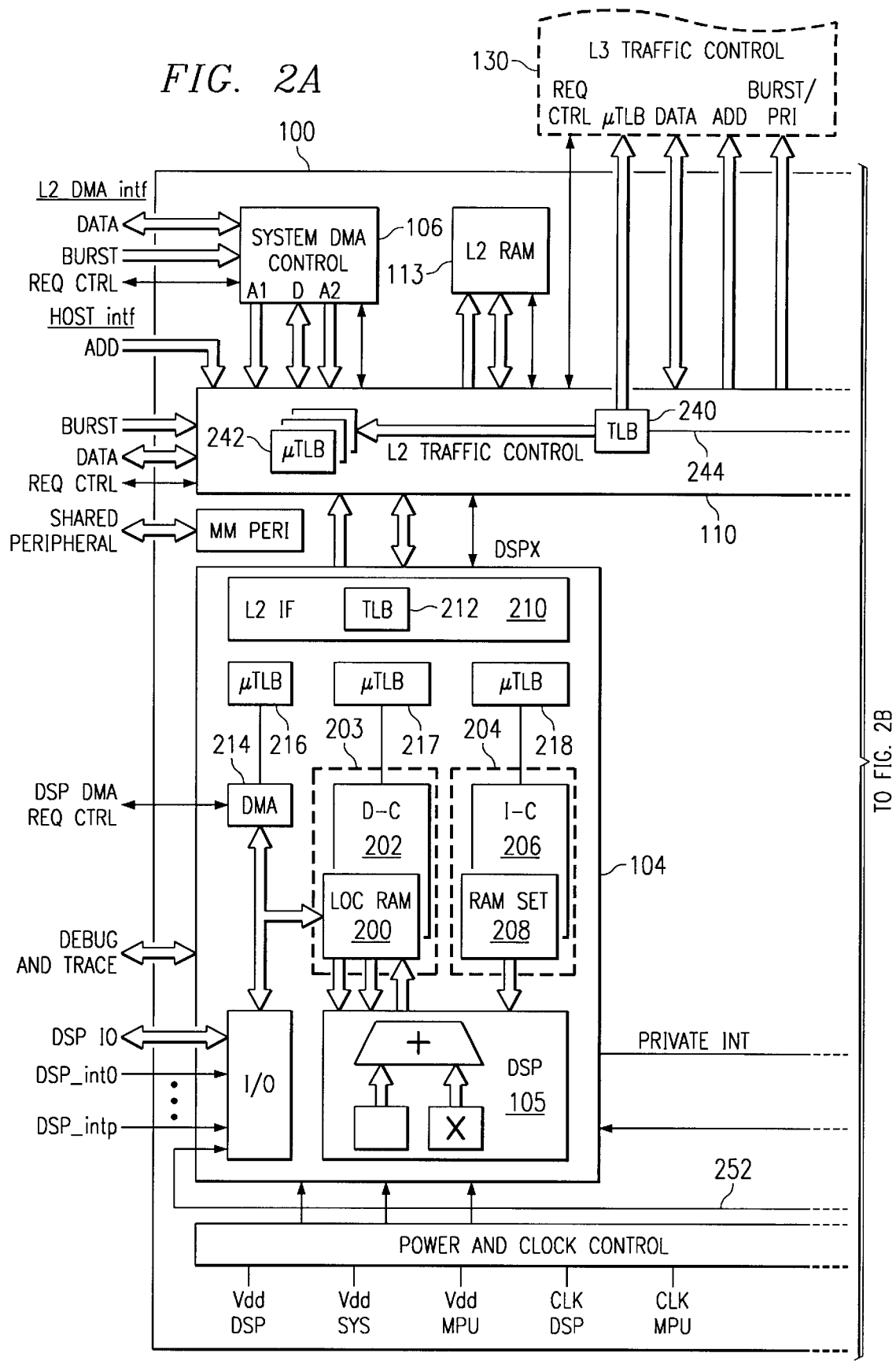
FIGS. 2A and 2B together is a more detailed block diagram of the megacell core of FIG. 1.
Figure 2B:
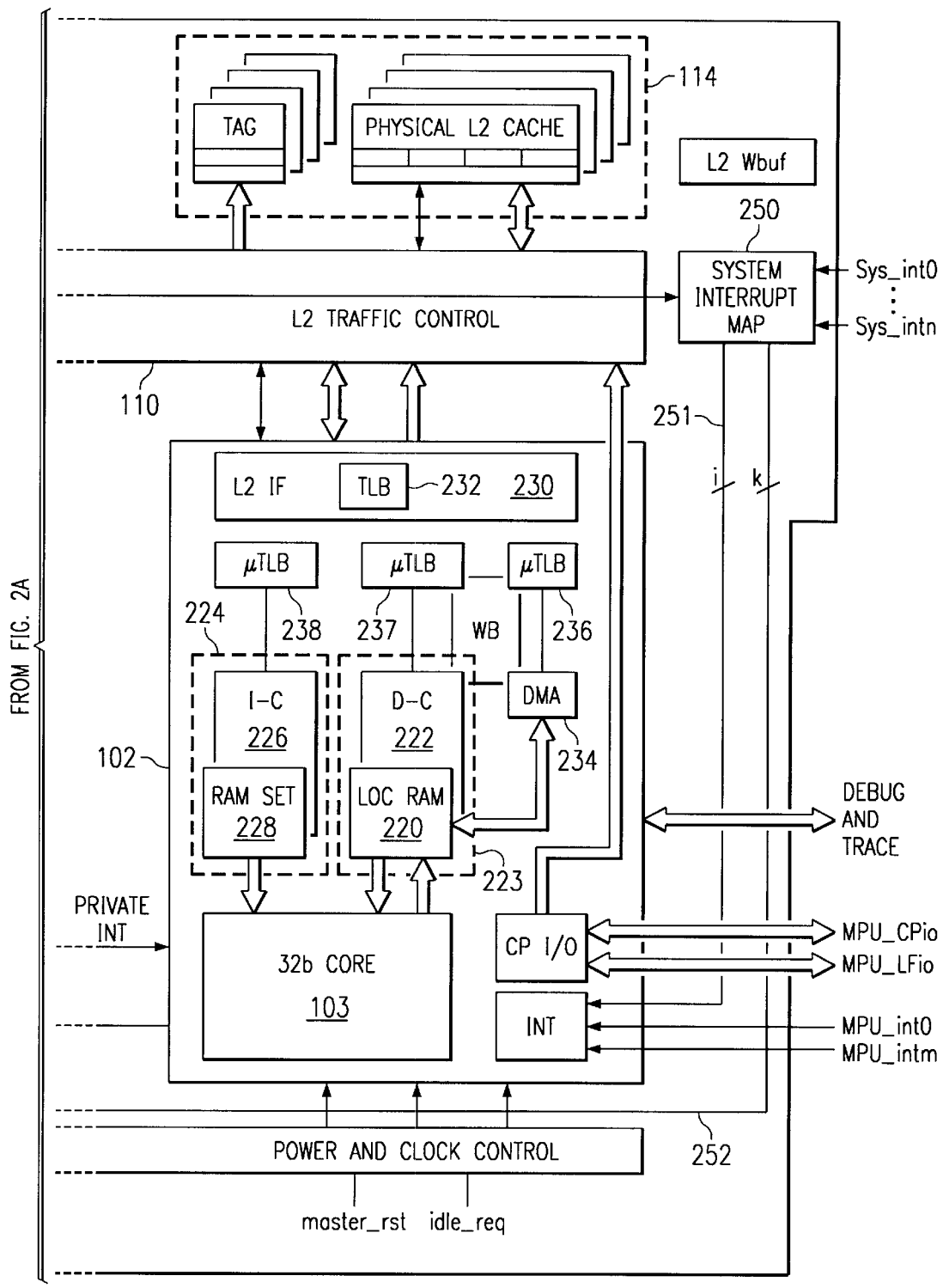

FIG. 2, comprised of FIG. 2A FIG. 2B together, is a more detailed block diagram of the megacell core of FIG. 1. DSP 104 includes a configurable cache 203 that is configured as a local memory 200 and data cache 202, and a configurable cache 204 that is configured as instruction cache 206 and a RAM-set 208, which are referred to as level one (L1) memory subsystems. The DSP is connected to the traffic controller via an L2 interface 210 that also includes a translation look-aside buffer (TLB) 212. A DMA circuit 214 is also included within the DSP. Individual micro TLBs (μTLB) 216–218 are associated with the DMA circuit, data cache and instruction cache, respectively.

Similarly, MPU 102 includes a configurable cache 223 that is configured as a local memory 220 and data cache 222, and a configurable cache 224 that is configured as instruction cache 226 and a RAM-set 228, again referred to as L1 memory subsystems. The MPU is connected to traffic controller 110 via an L2 interface 230 that also includes a TLB 232. A DMA circuit 234 is also included within the MPU. Individual micro TLBs (μTLB) 236–238 are associated with the DMA circuit, data cache and instruction cache, respectively.

L2 traffic controller 110 includes a TLB 240 and one or more micro-TLB (μTLB) 242 that are associated with system DMA block 106, host processor interface 120b for a host connected at level two, and other application specific hardware accelerator blocks. Similarly, L3 traffic controller 130 includes a μTLB controllably connected to TLB 240 that is associated with system host 120a at level three. This μTLB is likewise controlled by one of the megacell 100 processors.

Memory Management Unit

At the megacell traffic controller level, all addresses are physical. They have been translated from virtual to physical at the processor sub-system level by a memory management unit (MMU) associated with each core, such as DSP core 105 and MPU core 103. At the processor level, access permission, supplied through MMU page descriptors, is also checked, while at the megacell level protection between processors is enforced by others means, which will be described in more detail later.

The translation look-aside buffer (TLB) caches contain entries for virtual-to-physical address translation and access permission checking. If the TLB contains a translated entry for the virtual address, the access control logic determines whether the access is permitted. If access is permitted, the MMU generates the appropriate physical address corresponding to the virtual address. If access is not permitted, the MMU sends an abort signal via signal group 244 to the master CPU 102. The master CPU is identified by the value of a resource identification (R-ID) field. On a slave processor such as a hardware accelerator the R-ID is equal to the R-ID of the master CPU.

Upon a TLB miss, i.e., the TLB does not contain an entry corresponding to the requested virtual address, translation table walk software retrieves the translation and access permission information from a translation table in physical memory. Once retrieved, the page or section descriptor is stored into the TLB at a selected victim location. Victim location selection is done by software or with hardware support using methods known by persons skilled in the art.

Translation Table

To provide maximum flexibility, the MMU is implemented as a software table walk, backed up by TLB caches both at the processor sub-system and megacell level. This allows easy addition of new page size support or new page descriptor information if required. A TLB miss initiates a TLB handler routine to load the missing reference into the TLB. At the Megacell 100 level, a TLB miss asserts a miss signal in signal group 244 and is routed via system interrupt router 250 to the processor having generated the missing reference or to the processor in charge of the global memory management, via interrupt signals 251, 252. Translation tables and TLB cache contents must be kept consistent. A flush operation is provided for this reason.

An address reference is generally located within the μTLB or main TLB of each processor sub-system; however, certain references, such as those used by system DMA 106 or host processor 120, for example, to access megacell memories can be distributed within L2 traffic controller 110 and cached into L2 system shared TLB 240. Because system performance is very sensitive to the TLB architecture and size, it is important to implement efficient TLB control commands to lock entries for critical tasks or unlock and flush those entries when a task is deleted without degrading the execution of other tasks. Therefore, each TLB and L2 cache entry holds a task-ID. Commands are supplied to flush locked or unlocked entries of a TLB/μTLB corresponding to a selected task.

As part of the page descriptor information, the MMU provides cacheability and bufferability attributes for all levels of memory. The MMU also provides a "Shared" bit for each entry to indicate that a page is shared among multiple processors (or tasks). This bit, as standalone or combined with the task-ID, allows specific cache and TLB operation on data shared between processors or/and tasks. The MMU may also provide additional information, such as cache write allocate selection on a page basis, which will be described later.

All megacell memory accesses are protected by a TLB. As they all have different requirements in term of access frequencies and memory size, a shared TLB with individual μTLB backup approach has been chosen to reduce the system cost at the megacell level. This shared TLB is programmable by each processor. The architecture provides enough flexibility to let the platform work with either independent operating systems (OS) on each processors or a distributed OS with a unified memory management, for example.

The present embodiment has a distributed operating system (OS) corresponding to each processor but only a single table manager for all processors. Slave processors do not manage the tables. In a first embodiment slave processors R-ID are equal to the R-ID of the master CPU. In another embodiment, they could, however, have a different R-ID to control their TLB entries lock/unlock entries corresponding to some of their own tasks or flush all their entries, when putting themselves in sleep mode to free entries for the others processors. Having different R-ID provides a means to increase security in a concurrent multi-processor environment, processor X cannot access memory allocated to processor Y.

In another embodiment with several independent OS(s), for example, there will be independent tables. These tables can be located in a memory space only viewed by the OS that they are associated with in order to provide protection from inadvertent modification by another OS. As they manage the virtual memory and task independently, the R-ID provides the necessary inter-processor security. R-IDs are managed by a single master CPU. This CPU can make TLB operations on all TLB entries. TLB operation or memory accesses from slave processor are restricted by their own R-ID. The CPU master will have rights to flush out entries belonging to another processor in a different OS domain.

The organization of the data structures supporting the memory management descriptor is flexible since a software TLB-miss handler resolves each TLB miss. These data structures include the virtual-to-physical address translation and additional descriptors to manage the memory hierarchy. An example list of these descriptors and their function is described in Table 1. Various memory access permission attributes can be specified. In other embodiments, a processor may have other modes that enable access to memory without permission checks. Similarly, other embodiments may provide more or fewer permission attributes and/or more or fewer memory management descriptors.

TABLE 1

Memory Management Descriptors

| | |
|---|---|
| Memory Access Permissions attributes | Supervisor: no access, read only, read/write<br>User: no access, read only, read/write |
| Execute Never | provides access permission to protect data memory area from being executed. This information can be combined with the access permission described above or kept separate. |
| Shared | indicates that this page may be shared by multiple tasks across multiple processor. |
| Cacheability | Various memory entities such as individual processor's cache and write buffer, and shared cache and write buffer are managed through the MMU descriptor. The options included in the present embodiment are as follows:<br>Inner cacheable, Outer cacheable, Inner Write through/write back, Outer write through/write back, and Outer write allocate. The terms Inner and outer refer to levels of caches that are be built in the system. The boundary between inner and outer is defined in specific embodiment, but inner will always include L1 cache. In a system with 3 levels of caches, the inner correspond to L1 and L2 cache and the outer correspond to L3 due to existing processor systems. In the present embodiment, inner is L1 and outer is L2 cache. |

MMU/TLB Control Operation

Figure 3:
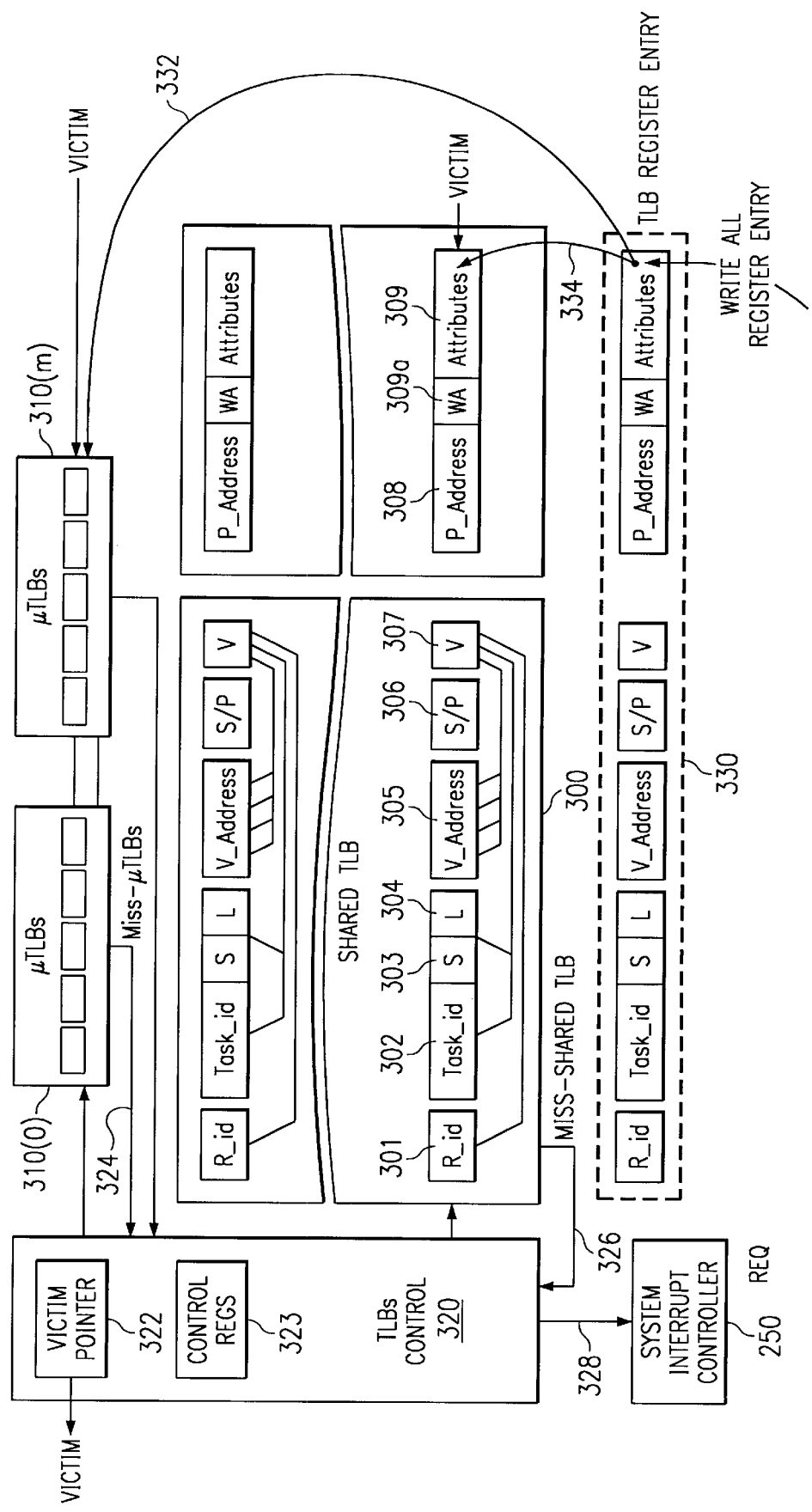
FIG. 3 is a block diagram illustrating a shared translation lookaside buffer (TLB) and several associated micro-TLBs (μTLB) included in the megacell of FIG. 2.

FIG. 3 is a block diagram illustrating a shared translation look-aside buffer (TLB) 300 and several associated micro-TLBs (μTLB) 310(0)–310(m) included in megacell 100 of FIG. 2. On a μTLB miss, the shared TLB is first searched.

TLB controller 320 is alerted by asserting a μTLB miss signal 324. In case of a hit on the shared TLB, the μTLB that missed is loaded with the entry content of the shared TLB 300. In case of miss in shared TLB 300, the shared TLB alerts TLB controller 320 by asserting a TLB miss signal 326. Controller 320 then asserts an interrupt request signal 328 to system interrupt controller 250. Interrupt controller 250 asserts an interrupt to the processor who's OS supervises the resource that caused the miss. A TLB entry register 330 associated with TLB controller 320 is loaded by a software TLB handler in response to the interrupt. Once loaded, the contents of TLB entry register 330 are transferred to both shared TLB 300 and the requesting μTLB at a selected victim location as indicated by arcs 332 and 334.

A separate TLB entry register 330 is only one possible implementation and is not necessarily required. The separate TLB entry register is a memory mapped register that allows buffering of a complete TLB entry (more than 32 bits). A TLB value is not written directly in the TLB cache but is written to the TLB entry register first. Because of the size of an entry, several writes are required to load the TLB entry register. Loading of a TLB cache entry is then done in a single operation "Write TLB entry". Advantageously, other μTLBs associated with other modules can continue to access the shared TLB while the TLB entry register is being loaded, until a second miss occurs. Advantageously, by controlling access to the TLB via the TLB entry register, CPUs have no direct access to TLB cache internal structure and thus the risk of partial modifications inconsistent with the MMU tables is avoided.

The sequence of operations to update a TLB cache entry after a miss is:

1—the software TLB handler writes to the TLB entry register,

2—the software TLB handler sends a command to write the TLB entry, which transfers a value from TLB entry register to a preselected victim TLB cache entry; and 3—control circuitry checks and preselects a next victim TLB entry, in preparation for the next miss. In this embodiment, this step is generally performed in background prior to the occurrence of a miss.

Advantageously, TLB cache entries can be preemptively updated under OS software control to prevent TLB miss by pre-loading a new entry, using the following sequence of operation:

1—control circuitry checks and selects a TLB entry, referred to as a victim TLB cache entry.

2—the software TLB handler writes to the TLB entry register, and

3—the software TLB handler sends a command to write the TLB entry, which transfers a value from TLB entry register to the selected victim TLB cache entry.

The priority on the shared TLB is managed in the same way as priority on a memory access. One or more resources can be using the shared TLB. One or more resources can program the shared TLB. The replacement algorithm for selecting the next victim location in the shared TLB is under hardware control. A victim pointer register 322 is maintained for each TLB and μTLB to provide a victim separate pointer for each. A typical embodiment will use a round robin scheme. Another embodiment may use a least recently used scheme or a random scheme, for example. Different TLBs within a single megacell can use different replacement schemes. However, in an embodiment in which the system has a master CPU with a distributed OS, this master CPU could also bypass the hardware replacement algorithm by selecting a victim entry, reading and then writing directly to the shared TLB, for example.

In this embodiment, each shared TLB has 256 entries. Each μTLB is generally much smaller, i.e., has fewer entries, than the shared TLB. In various embodiments, each shared TLB has 64–256 or more entries while μTLBs generally have 4–16 entries. The penalty for a miss in a μTLB is small since a correct entry is generally available from the shared TLB. Therefore, the present embodiment does not provide direct control of the victim pointers of the various μTLBs; however, direct control of the victim pointer of shared TLBs, such as 212, 232, and 240, is provided.

Each entry in a TLB has a resource identifier 301 along with task-ID 302. Resource-IDs and task IDs are not extension fields of the virtual address (VA) but simply address qualifiers. Resource IDs are provided by a resource-ID register associated with each resource; such as R-ID register 442a associated with resource 440 and R-ID register 442n associated with resource 450 of FIG. 4. Resource 440 is representative of various DMA engines, coprocessor, etc within megacell 100 and/or an external host connected to megacell 100. Resource 450 is representative of various processors within megacell 100. Each resource 440, 450 typically has its own associated R-ID register; however, various embodiments may choose to provide resource ID registers for only a selected portion of the resources. A task ID is provided by a task-ID register, such as task-ID register 444a associated with resource 440 and task-ID register 444n associated with resource 450. A task register associated with a non-processor resource, such as DMA, a coprocessor, etc, is loaded with a task value to indicate the task that it is supporting.

In another embodiment, only processor resources 440, 450 that execute program modules have an associated programmable task-ID register. In this case, a system wide default value may be provided for access requests initiated by non-processor resources such as DMA. The default value may be provided by a programmable register or hardwired bus keepers, for example.

Advantageously, with the task-ID, all entries in a TLB belonging to a specific task can be identified. They can, for instance, be invalidated altogether through a single operation without affecting the other tasks. Advantageously, the resource ID permits discrimination of different tasks being executed on different resources when they have the same task number. Task-ID number on the different processors might not be related; therefore, task related operations must be, in some cases, qualified by a resource-ID.

In another embodiment, the R-ID and Task_ID registers are not necessarily part of the resource core and can be located elsewhere in the system, such as a memory mapped register for example, and associated to a resource bus. The only constraint is that a task_ID register related to a CPU must be under the associated OS control and updated during context switch. R-ID must be set during the system initialization. In some embodiments at system initialization, all R-ID and Task-ID registers distributed across the system are set to zero, which is a default value that causes the field to be ignored. In other embodiments, a different default value may be used. In other embodiments, R-ID "registers" provide hardwired values.

Referring again to FIG. 3 each TLB entry includes a virtual address field 305 and a corresponding physical address field 308 and address attributes 309. Various address attributes are described in Table 1. Address attributes define conditions or states that apply to an entire section or page of the address space that is represented by a given TLB entry.

An aspect of the present invention is that a write allocate (WA) attribute bit 309a is included in each TLB entry. The write allocate attribute bit selectively specifies whether write transactions to the level 2 cache should include write allocation or not. The operation of the write allocate attribute bit will be described in more detail below.

An S/P field 306 specifies a page size. In the present embodiment, an encoding allows page sizes of 64 kb, 4 kb and 1 kb to be specified. Naturally, the page size determines how many most significant (ms) address bits are included in a check for an entry. Each TLB entry also includes "shared" bit 303 and a lock bit 304. All entries marked as shared can be flushed in one cycle globally or within a task.

A V field 307 indicates if an associated TLB cache entry is valid. V field 307 includes several V-bits that are respectively associated with R-ID field 301 to indicate if a valid R-ID entry is present, task-ID field 302 to indicate if a valid task-ID entry is present, and virtual address field 305 to indicate if a valid address entry is present. These valid bits enable compare logic for each associated field.

As mentioned earlier, the resource ID field and task ID field in each entry of the TLB/μTLB can be used to improve security. During program task execution, each transaction request is checked by the miss control circuitry of the TLB/μTLB to determine if the entry is allowed for a specific resource or for all resources and for a specific task or for all tasks. For example, if a request is received and a valid entry is present for the proffered virtual address but a task ID or R-ID which accompany the request does not match the corresponding valid task ID and R-ID fields of the entry, then a miss is declared. If the task ID and/or R-ID fields of the entry are marked as invalid, then they are ignored.

Shared Cache and RAM

Referring again to FIG. 1, Megacell 100 includes large shared memory subsystem 112 that functions as a secondary level of RAM (L2 RAM) 113 and cache (L2 Cache) 114. This level of memory is preferably called the outer level, as each processor in various embodiments may have multilevel internal memory. However, for the present embodiment, processors 102, 104 have one level of internal memory, which is referred to herein as L1 within the memory hierarchy, therefore the outer level memory subsystem will be referred to as level two (L2). The megacell outer memory 112 is organized as what's called a SmartCache, which is a configurable cache and which allows concurrent accesses on cache and RAM-set. RAM-set is a block of RAM that has aspects of cache behavior and cache control operations as well as DMA capability. The SmartCache architecture provides predictable behavior and enhanced real-time performance while keeping high flexibility and ease of use. A detailed description of a SmartCache is provided in U.S. patent application Ser. No. 09/591,537, entitled "Smart Cache" and is incorporated herein by reference. Advantageously, RAM-set configured as a RAM offers fast memory scratchpad feature.

A unified shared cache architecture of this embodiment is a four way set associative cache with segmented lines to reduce system latency. A segment is a portion of cache line that has a separate valid bit associated with it. In preferred embodiment, a level-2 cache segment corresponds to the size of a level-1 cache line. All outer memories are treated as unified instruction/data memory to avoid compiler restrictions such as data in program space or vice-versa. Size of this cache or the degree of associativity is a design choice and may vary in other embodiments of the present invention. General construction of set-associative caches are known and need not be described in detail herein. Typically, L1 caches are 16 kbytes or 32 kbytes, and the L2 cache. is 128 kbytes, 256 kbytes or larger, for example. Likewise, the number of associated RAM-sets may vary in other embodiments.

RAM-set control registers in cache control circuitry are memory mapped and therefore also benefit from the protection provided by the MMU. However, this would force operations on cache or any specific RAM-set to be on separate pages for protection reasons. Therefore, a control register is provided in TLB control register set 323 (FIG. 3) to configure how and by which CPU the various parts of megacell memory are controlled. All CPUs can execute operations such as cache flushing or cache cleaning as these operations will be restricted by a resource identifier field located in the TAG area of the cache.

The unified cache memory of the present embodiment supports write back, and write through with/without write-allocate on a page basis. These controls are part of the MMU attributes. Hit under miss is supported to reduce conflicts between requesters and consequent latency. Concurrent accesses on RAM-sets and cache are supported.

Figure 4:
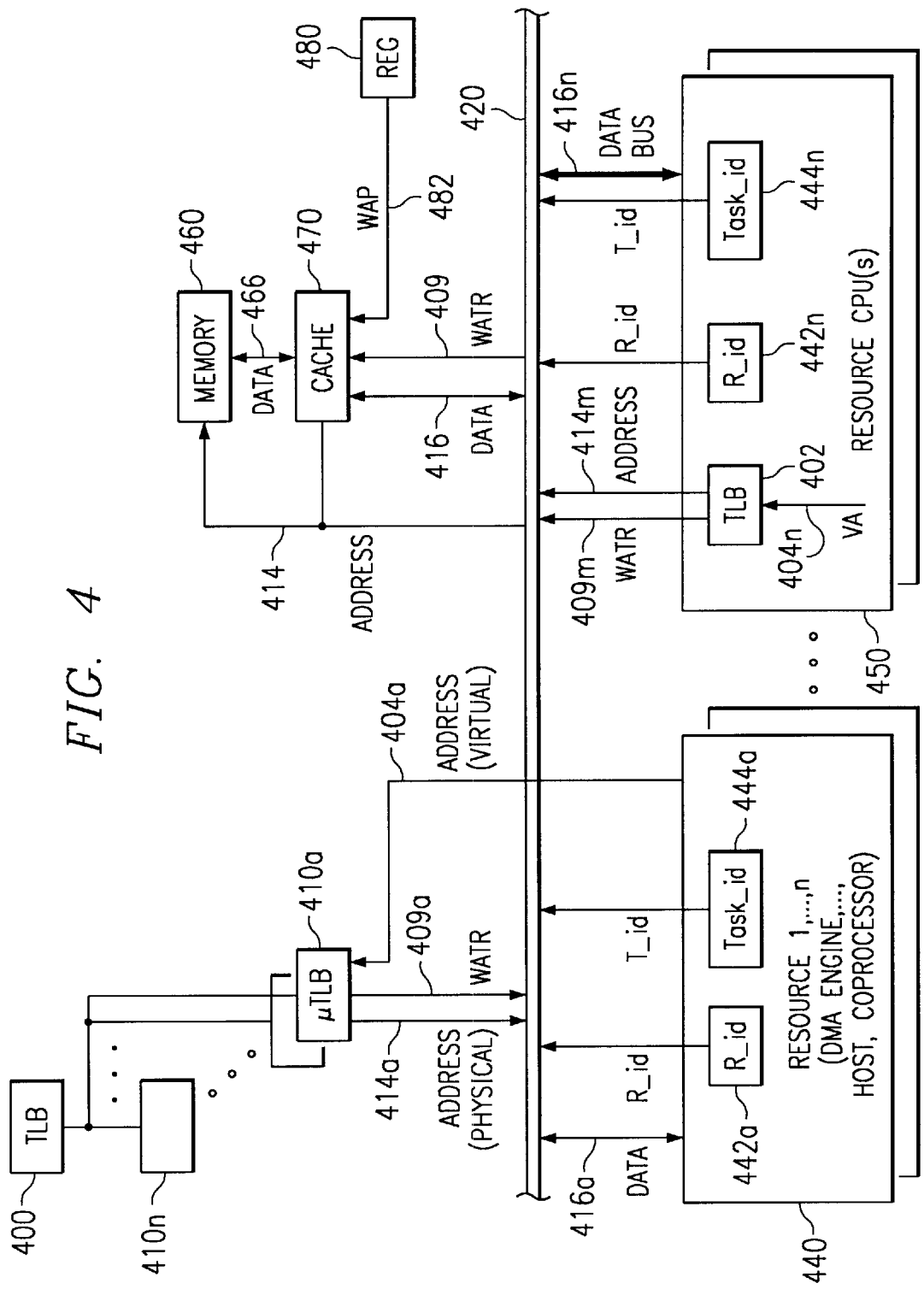
FIG. 4 is a block diagram of the digital system of FIG. 1 illustrating selective write allocation responsive to attribute signals from several processors and a write allocation policy circuit.

FIG. 4 is a block diagram of a digital system of FIG. 1 illustrating selective write allocation responsive to attribute signals from several processors. As described above, each TLB 400, 402 or μTLB 410a–n provides a translated physical address 414a, 414n in response to a virtual address value 404a, 404n provided by an initiator resource in a transaction request. Additionally, a write allocate transaction (WATR) signal 409a, 409n is provided by the TLB/μTLB along with the translated physical address. WATR reflects the value of the write allocate attribute associated with the virtual address of the transaction request. Thus, if WATR is asserted, then the associated write transaction is also requesting write allocation in the L2 cache. Traffic control circuitry 420 provides arbitration and passes the highest priority transaction request to storage resource 460. The transaction request includes a physical address value on address bus 414 and a WATR value on WATR bus 409.

An aspect of the present invention is that operation of the write allocate attribute bit can be modified by a system policy that can be indicated by a bit in a register, such as register 480. Write allocate policy (WAP) signal 482 provides the value of a write allocate policy bit in register 480 to control circuitry in cache 470. If the WAP signal is asserted, then selective write allocation is performed, otherwise write allocation is performed in accordance with the WATR signal. The write allocate policy bit is controlled by the operating system and may be changed from time to time according to what tasks are being executed.

Data bus 416–466 is arranged so that data being transferred between an initiator resource 440, 450 and storage resource 460 can be cached with selective write allocation in shared cache memory 470 in a manner that is defined by the WATR signal provided by each transfer request in combination with the WAP signal provided by policy register 480. Advantageously, this allows data that is being transferred to a selected address in memory 460 by one task to be cached in one manner, and data that is being transferred to the same address by another task on a same or on a different processor to be cached in a different manner.

Figure 5:
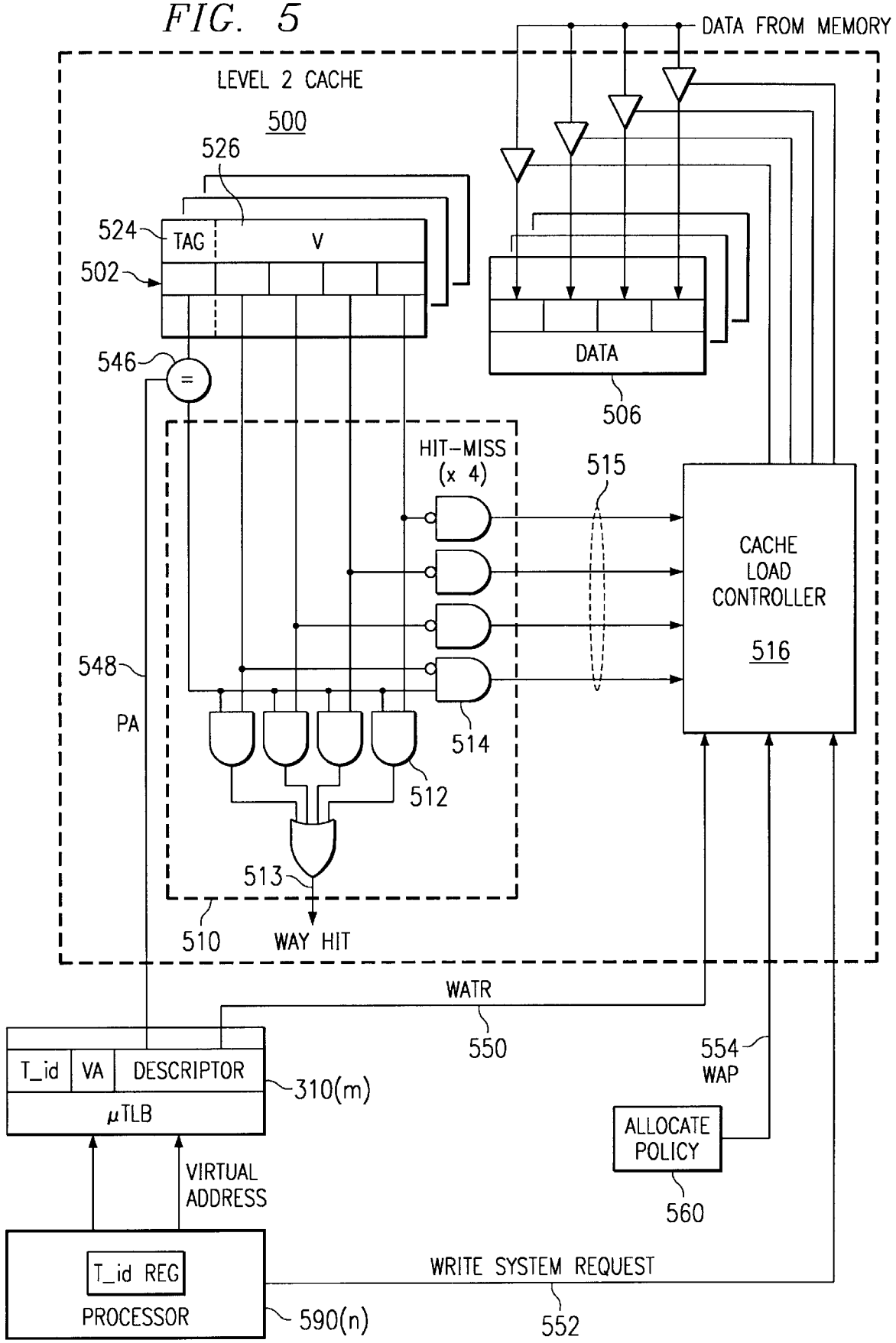
FIG. 5 is a block diagram illustrating circuitry for providing selective write allocation for the L2 cache in the system of FIG. 1.

FIG. 5 is a block diagram illustrating circuitry for providing selective write allocation for the L2 cache in the system of FIG. 1. In computing systems, write allocation is a common technique used in data caches in order to improve processor performance. When a write miss occurs, write allocation is performed by loading in the data cache the corresponding line from the memory before writing the data, so that it may be accessed later with a minimum latency. This is particularly interesting for data accesses that have strong temporal locality, such as stack management in routine calls or context switches, since all pushed data are very likely to be popped afterwards.

One drawback is that write allocation efficiency is highly dependant on data locality properties, and may introduce cache miss degradation due to self-interference or inter-tasks interference if written data are not reused afterwards, particularly when the number of tags is limited such as in small caches or in caches with long lines. Advantageously, the present invention provides a means for selectively enabling write allocation so that cache performance can be optimized.

As discussed above, the L2 cache of the present embodiment is composed of a 4-way set-associative cache that includes a TAG Array 502(0-3) and Data array 506(0-3) and one or more additional RAM-sets, not shown here. In the present embodiment, each data array is 32 kbytes. For simplicity, only a single set will now be described. The other sets are all similar. and other embodiments may have a different number of sets.

During an access request, each TAG array 502 provides a tag value to a respective comparator 546 and is compared against a most significant portion of a proffered address 548. A tag value is stored in tag array 502 according to an index value that corresponds to a least significant address of a proffered address. Thus, for any proffered address, an associated tag may be found on any of the four tag arrays. If a tag matches a proffered address, then hit/miss logic 510 asserts a respective hit signal hit-way 513. Prefetch circuitry 516 forms a request to L3 memory when a miss occurs.

During each transaction request, write request signal 552 indicates if the transaction request is a write request. For write requests, write allocate transaction (WATR) signal 550 is provided by TLB 310, as described above. If the WATR signal is asserted for a given transaction, then selective write allocation is requested. If the WATR signal is not asserted for a given transaction, then write allocation is not performed for that transaction.

Referring still to FIG. 5, write-allocate policy circuitry 560 is also provided as a bit in a system register in this embodiment of the invention. Circuitry 560 is one bit of a memory-mapped system control register in the system of FIG. 1. The write-allocate policy circuit permits system wide selection of static write allocation or selective write allocation as described above. Thus, if write allocate policy signal 554 is asserted, for example, then prefetch circuitry 516 performs selective write allocation on each transaction request in response to WATR signal 550. However, if write allocate policy signal 554 is not asserted, then prefetch circuitry 516 always performs write allocation in accordance with WATR signal 550. Table 2 summarizes interactions of the WATR and WAP signals.

TABLE 2

Selective Write Allocation

```
if "WATR == Yes" then          /* write request with write allocate */
    if "Tag matching" then
        if "Segment valid" then
            cache write hit;    /* no need to allocate in that case */
        else
            write miss with segment write allocation
        end
    else                        /* in case of cache write miss */
        if "WAP = selective" then
            write miss - no allocation;
```

TABLE 2-continued

Selective Write Allocation

```
        else
            write miss with line allocation;
        end
    else
        no allocation (whatever happens, Tag matching or not,
        segment valid or not);
    end
```

According to an aspect of the present invention, selective write allocation of a line in the cache for a write transaction is performed only if a tag for that line is valid and only on invalid segments within that line. Recall that a segment is a portion of cache line that has a separate valid bit associated with it. If the tag is not valid, then no write allocation is performed when the selective allocation policy bit is asserted. AND-OR circuitry 512 of hit-miss circuitry 510 asserts hit signal 513 if a proffered address matches tag field 524 of tag array 502 AND if a selected valid bit 526 is also asserted to indicate the requested segment of the line being accessed within data array 506 is valid. At the same time, one or more of hit-miss signals 515 may be asserted by AND gates 514 if a selected tag 524 matches the proffered address AND one or more segment valid bits 526 are not valid. Thus, for a given write transaction in which write allocate signal 550 is asserted, if a hit-miss signal 515 is asserted, then prefetch circuitry 516 performs write allocation of a line in the cache by prefetching segments for a line in which one or more segments are invalid; however, if there is not a tag match, then no prefetch is performed.

In another embodiment of the invention. write-allocate policy circuitry 560 may be included with each of several processors that share access to an L2 cache. In this case, a WAP signal is included as a signal on the system bus that provides the transaction request to the cache.

FIG. 6 is a flow chart illustrating operation of selective write allocation. according to aspects of the present invention. At node 600, a write transaction request is initiated by an initiator resource in a digital system to a proffered address in a back-up memory resource. such as memory 460 of FIG. 4. A write allocate transaction (WATR) signal is also provided with the write transaction request, as described above.

At node 602, the WATR signal is tested. If the signal is asserted to indicate that this transaction is to perform write allocation, then the process proceeds to node 604. If the signal is not asserted indicating no write allocation, then the process proceeds to node 612.

At node 604, cache hit/miss circuitry determines if there is a line in the cache with a tag that matches the proffered address. If there is not a tag match, then the write allocation policy signal is checked in step 614. However, if there is a tag match, then the process moves to step 606 where the associated valid bits are checked.

At node 606, the valid bit of the requested segment is checked. If the valid bit is asserted, then the requested segment is already in the cache and no allocation needs to be done as indicated by node 608. If the valid bit is not asserted, then a segment write allocation is performed in step 620. As described above, an L2 segment is the same size as an L1 cache line. Thus, additional instructions/data are accessed from the backup memory in order to completely populate the L2 cache segment that is being written to by the current write request.

If a tag matches, segment write allocation is performed in node 620 by pre-fetching data/instructions from the back-up memory resource for any segments within the cache line that are not already valid. Such a situation can happen in an L2 cache for lines or segments that have been invalidated but not yet reused, for example. Such a situation may also occur if a prefetch of a line in the catch was terminated due to an interrupt, for example.

Referring again to step 604, if there was not a tag match, then at node 614 a check is made to determine the write-allocate policy of the system. The write-allocate policy can be specified by a system register, such as policy register 560, for example. If the write-allocate policy is "selective", then a write allocation is not performed as indicated by node 612, even though the WATR signal was asserted for this transaction request. If the mode is not selective. then write allocation is always performed in accordance with the WATR signal provided with the transaction request. In this case, since step 602 determined the WATR signal is asserted for this transaction, a segment allocation will be performed in step 616.

At node 610, the write transaction is completed according to system policy or according to other attribute bits provided by the TLB entry for this transaction request, such as those described in Table 1. For example, write through may be performed, or write back may be performed if dirty bits are provided in the cache.

Advantageously, the write allocate attribute bit provided by the TLB can selectively direct write allocation based on the address of the transaction (pages, for example) while the write allocation policy circuitry can then refine write allocation operation over time based on a currently executing task or on other factors known to the OS, for example.

While in this embodiment, steps 616 and 620 perform segment write allocation, in another embodiment one or the other or both of these steps may perform line allocation, in which an entire cache line is then prefetched in response to a miss.

Figure 7:
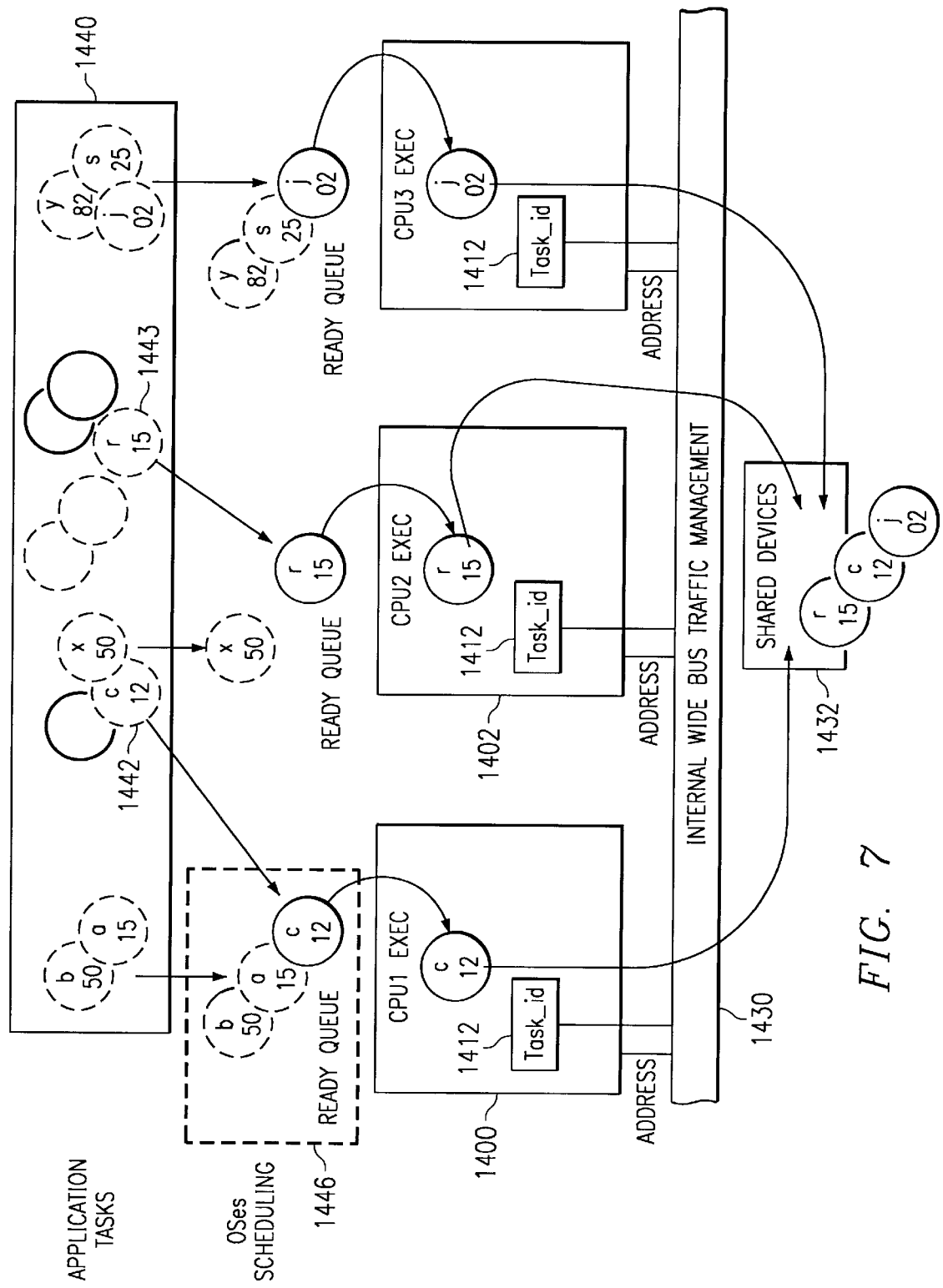
FIG. 7 is a block diagram of a digital system similar to that of FIG. 1 illustrating a cloud of tasks that are scheduled for execution on the various processors of the digital system.

FIG. 7 is a block diagram of a digital system similar to that of FIG. 1 illustrating cloud of tasks that are scheduled for execution on the various processors of the digital system. Typically, each software task includes a task priority value that is commonly used by an operating system to schedule an order of execution for a set of pending tasks 1440.

In this illustration, a circle such as 1442 represents a task, with a task name "c" and a task priority of 12, for example. Likewise, task 1443 has a task name "r" and a priority of 15, where a lower number indicates a higher priority. If the set of tasks 1440 are assigned to three processors, then an operating system on each processor forms a ready to execute queue, such as ready queue 1446 in which task "c" is scheduled for first execution, then task "a" and finally task "b" according to priority values of 12, 15, and 50 respectively. The Task ID register in each processor is loaded when a task is invoked.

Referring again to FIG. 3, in an alternative embodiment of the invention, each TLB entry also includes a task related write allocate attribute (WA) instead of an address related write allocate attribute. A task related WA value is provided along with a translated physical address for each transaction request, the operation of which is similar to that described above. Advantageously, a task related WA value is provided to the TLB via a task control block associated with each task rather than via the system MMU table.

Table 3 illustrates several portions of an example instruction code sequences in a task is spawned. From line 1 to line 5, task "c" is active and spawns a new task, "audio" on line 5. The kernel is then invoked to instantiate the new task and create an associated task control block (TCB). A TCB is a control structure that is stored in memory; a separate TCB is used to identify each instantiation of a task, as is generally known. An eight-bit (numbers of bits can be more or less in other embodiments) task-ID field is stored in the TCB at line 11. At line 12, a task memory attribute value is stored in the TCB.

During the context switch (reschedule in line 14) before launching the "audio" the kernel loads task-ID register 1412 with the task-ID value held in the TCB (Table 4) or in another table. At line 15, the new task is now active.

TABLE 3

Setting Task ID at the Start of a Task

| | |
|---|---|
| 1 | // (Task c code execution) |
| 2 | Instruction 1 |
| 3 | ------ |
| 4 | instruction n |
| 5 | Taskspawn("audio",200,0,5000,(FUNCPTR)audio,// (Task ccode execution: instruction n+2) |
| 6 | //(Kernel code execution) |
| 7 | ----- |
| 8 | TaskCreate( ) |
| 9 | //(taskcreate code execution) |
| 10 | ------ |
| 11 | SetTaskArtributeID(TID) |
| 12 | SetTaskAtrributeMA(WA) |
| 13 | ------- |
| 14 | // Kernel reschedule code execution |
| 15 | //(Task Audio code execution) |
| 16 | Instruction 1 |
| 17 | ------ |

As the new task begins to execute, data transfer requests to memory are initiated by either a processor that is executing the task, or by other initiator resources such as a DMA resource in support of the task. Since this is a new task, misses may occur in the TLB due to new pages of memory being accessed by the new task. Of course, if the task had been previously executed, correct page entries may already be present in the TLB. Also, as described below, if the new task accesses a page of memory that has previously been accessed by another task and the page entry is still present in the TLB, a miss will still occur if the task-valid bit is set because the task-ID field does not match the new task-ID value provided by the initiator resource with each data transfer request. The MMU handler will be invoked to handle each of the TLB misses and will access, in addition to the standard MMU table, the TCB of the currently executing task in order to obtain WA values for WA field 309a of each new TLB entry that is handled.

Advantageously, by accessing TCBs to obtain WA values to be included as memory attributes in each TLB entry, the contents of the operating system memory address translation tables are not impacted.

Table 4 is an example task control block that is used to define a task memory attribute value. Typically, the OS uses a 32-bit task-ID that is in fact an address that enables the OS to locate the task control block information. At line 4, an execution priority value is defined that is used by the operating system to schedule execution of the task. At line 5, a task-ID value is defined that is used to set the task ID register when the task is instantiated. At line 6, the task memory attribute is defined.

TABLE 4

Setting Task ID Using a TCB

```
1   TCB (task control block)
2   Typedef struct TCB
3   {
4   UINT OS-priority
5   UINT Task_ID
6   WA Task attribute      // WA composite "C" data type holding Task
                           // write allocation Information
7   ---
8   if CPU_FAMILY == xx
9   EXC_INFO excinfo;
10  REG_SET regs;
11  ...
12  #endif
13  }
```

For a given task-id, there can be different WA values depending on the address range. In this embodiment, the ranges of address correspond to pages. Therefore, several TLB entries may be used for the same task for the different pages. each of them having a different WA value. The information resides in the TCB in a composite "C" Data type WAA that may hold several WAA values for several address ranges. Of course. other embodiments may equate an address range to something other than a page in an MMU, for example. Likewise, the various WAA values may be stored as separate entries in the TCB, for example.

In other embodiments, other means than a TCB may be provided for storing the task ID for use by the OS or MMU handler, such as a table of task-IDs, for example.

Referring again to FIG. 3, task related write allocate attribute field 309a can be set in response to information provided at line 6 of the TCB illustrated in Table 4. This information can be used directly by the MMU manager when loading a new entry in TLBs. In the present embodiment, WAA information is not maintained in page tables but is inserted by the TLB miss handler at the time of a TLB miss by using the task-ID value of the transaction request that caused the TLB miss to access the corresponding task control block. Other embodiments may use other means for setting the WA field in the TLB entry, such as by storing this information in a separate table or in the MMU page tables. for example, but this might require multiple table entries for a same page if different tasks use the same page.

In the present embodiment, the valid bit associated with the task-ID field is loaded through the MMU table walk and is part of the MMU tables. Thus, when the TLB miss handler accesses a page table in response to a TLB miss, it queries the task-ID valid bit field of the MMU page table; if this bit field is asserted, then the TLB miss handler asserts the task-ID valid bit in the TLB entry and loads the task-ID value from the task-ID register of the requester that caused the TLB miss into task ID field 302. If the task-ID valid bit field of the MMU page table is not asserted, then the TLB miss handler de-asserts the task-ID valid bit in the TLB entry and the task-ID value from the task-ID register of the requester that caused the TLB miss is ignored. Thus, a page entry in the TLB can be made sensitive to the task-ID of a transaction request. or the task-ID can be ignored such that several tasks can use the same TLB entry.

Figure 8:
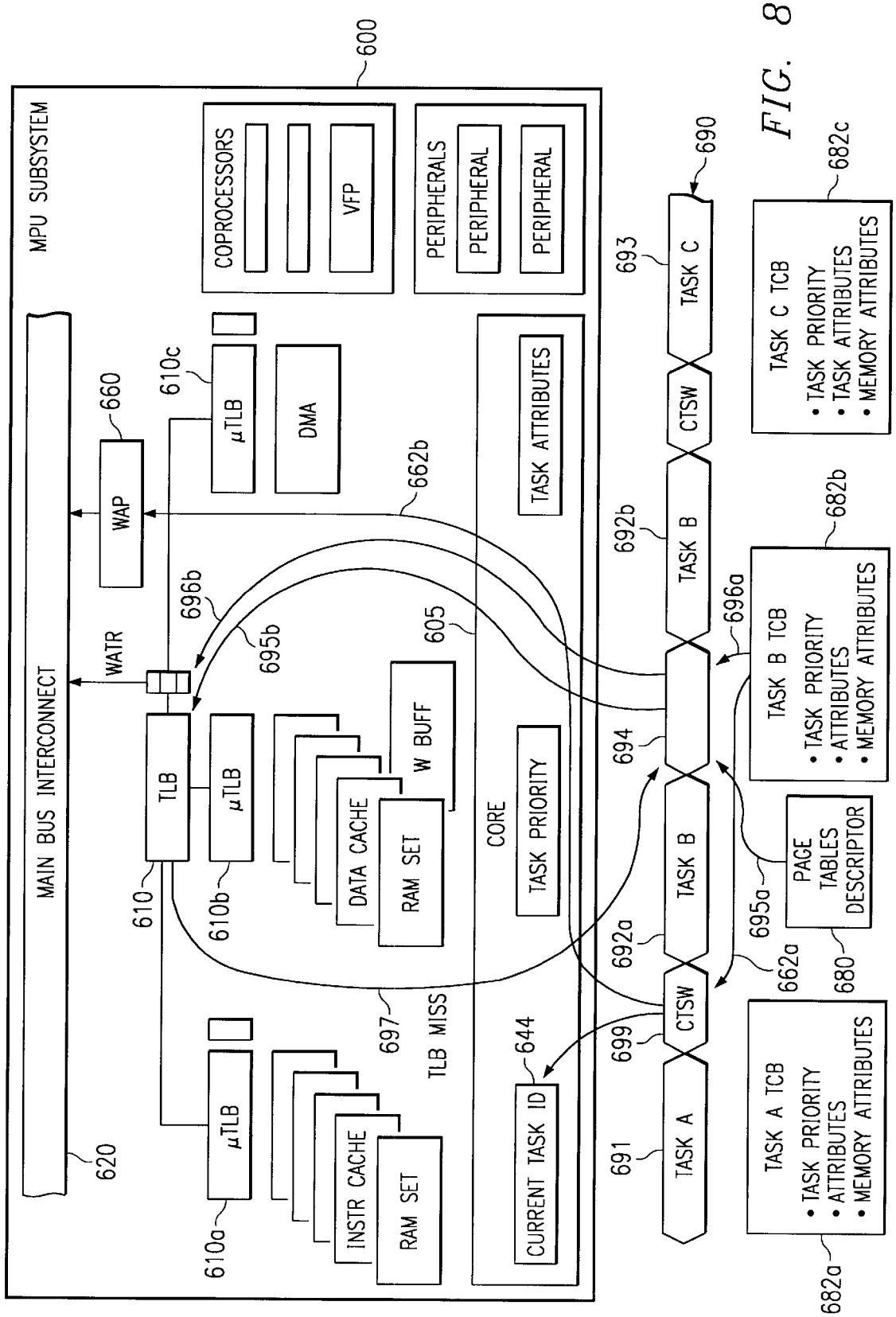
FIG. 8 is a combined timing diagram and flow diagram illustrating how task memory attributes are loaded into a memory management unit in the system of FIG. 7.

FIG. 8 is a combined timing diagram and flow diagram illustrating how task memory attributes are loaded into a memory management unit in the system of FIG. 7. Digital system 600 is a subsystem representative of any of the previously described processors, such as DSP 104 or MPU 102 of FIG. 1. Main bus interconnect 620 connects this processor subsystem to other subsystems. TLB 610 with associated µTLBs 610a–c operate as described previously. Task-ID register 644 provides a task-ID of a task being executed on processor core 605 as described previously. MMU page tables 680 are representative of earlier described MMU page tables. Task control block 682a is associated with task A, task control block 682b is associated with task B, and task control block 682c is associated with task C.

Timeline 690 illustrates sequential execution of three tasks. Task A executes during time period 691, task B executes during time periods 692a–b, and task C executes during time period 693. At each task transition, there is a context switch CTSW, such as during time period 699. As described previously, during each context switch, task-ID register 644 is loaded with a task-ID value of the new currently executing task.

When initiator resource 605 initiates a memory transfer request a page miss will occur if a corresponding page entry is not available in TLB 610, as represented during time period 694. An MMU handler task will then be invoked to handle the TLB miss. Page tables 680 will be accessed to provide a translated address and associated address attributes, as indicated at 695a and these will be loaded into TLB 610 as indicated at 695b. The TCB of the currently executing task, in this case task B, will be accessed in order to obtain a WA value for the WA field of the new TLB entry as indicated at 696a and this will be loaded into the TLB as indicated at 696b.

Advantageously, WA values can be provided by the task control blocks without modifying MMU tables 680.

In a similar manner, write allocate policy circuitry 660 can be established at each context switch, such as context switch 699 between task A and task B. At the time of a context switch, the task control block of the next scheduled task is consulted to determine the write allocation policy for that task, as indicated at 662a. This policy information is then established in write allocate circuitry 660 as indicated at 662b.

Digital System Embodiment

FIG. 9 illustrates an exemplary implementation of an example of such an integrated circuit in a mobile telecommunications device, such as a mobile personal digital assistant (PDA) 10 with display 14 and integrated input sensors 12a, 12b located in the periphery of display 14. As shown in FIG. 9, digital system 10 includes a megacell 100 according to FIG. 1 that is connected to the input sensors 12a,b via an adapter (not shown), as an MPU private peripheral 142. A stylus or finger can be used to input information to the PDA via input sensors 12a,b. Display 14 is connected to megacell 100 via local frame buffer similar to frame buffer 136. Display 14 provides graphical and video output in overlapping windows, such as MPEG video window 14a, shared text document window 14b and three dimensional game window 14c, for example.

Radio frequency (RF) circuitry (not shown) is connected to an aerial 18 and is driven by megacell 100 as a DSP private peripheral 140 and provides a wireless network link. Connector 20 is connected to a cable adaptor-modem (not shown) and thence to megacell 100 as a DSP private peripheral 140 provides a wired network link for use during stationary usage in an office environment, for example. A short distance wireless link 23 is also "connected" to earpiece 22 and is driven by a low power transmitter (not shown) connected to megacell 100 as a DSP private peripheral 140. Microphone 24 is similarly connected to megacell 100 such that two-way audio information can be exchanged with other users on the wireless or wired network using microphone 24 and wireless ear piece 22.

Megacell 100 provides all encoding and decoding for audio and video/graphical information being sent and received via the wireless network link and/or the wire-based network link.

It is contemplated, of course, that many other types of communications systems and computer systems may also benefit from the present invention, particularly those relying on battery power. Examples of such other computer systems include portable computers, smart phones, web phones, and the like. As power dissipation and processing performance is also of concern in desktop and line-powered computer systems and micro-controller applications, particularly from a reliability standpoint, it is also contemplated that the present invention may also provide benefits to such line-powered systems.

Fabrication of the digital systems disclosed herein involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

The digital systems disclosed herein contain hardware extensions for advanced debugging features. These assist in the development of an application system. Since these capabilities are part of the megacell itself, they are available utilizing only a JTAG interface with extended operating mode extensions. They provide simple. inexpensive, and speed independent access to the core for sophisticated debugging and economical system development, without requiring the costly cabling and access to processor pins required by traditional emulator systems or intruding on system resources.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

A storage resource is typically a memory or a cache; however, other resources may make use of selective write allocation capabilities as described herein. For example, memory mapped input/output (I/O) devices and ports, graphical or video frame buffers, etc. An initiator resource is generally a processor or a DMA controller; however, other resources may initiate transfer requests, such as smart I/O devices or ports or bridges to other systems or subsystems.

While the invention has been described with reference to illustrative embodiments, this description is not intended to be construed in a limiting sense. Various other embodiments of the invention will be apparent to persons skilled in the art upon reference to this description. For example, various sizes and configurations of cache may be optimized using selective write allocation. The concepts of write allocation and copy-back are not correlated; a cache embodiment that employs the concept of write-allocation according to the present invention may or may not also embody copy-back operation.

Write allocation attributes may be specified by means other than TLB entries. For example, a task related WA may be stored in a register, such as the task-ID register, and provided there-from with each write request. Alternatively, a look-up table may be provided that is responsive to transaction request addresses and which provides a WA signal there-from with each write request.

In another embodiment, a selective write allocation policy may be invoked for a period of time by setting a bit in a control register under programmatic control, such as at the beginning a particular code sequence. At the end of the code sequence, the control bit may then be programmatically reset to return to a write allocation policy of "always".

It is therefore contemplated that the appended claims will cover any such modifications of the embodiments as fall within the true scope and spirit of the invention.

What is claimed is:

1. A method for operating a digital system having a cache memory and an associated back-up memory, comprising the steps of:

establishing a write allocation policy;

initiating a write transaction request to an address in the back-up memory;

providing an attribute signal with the write transaction request; and performing write allocation in the cache memory in a manner in accordance with the attribute signal and the write allocation policy such that write allocation is performed in a selective manner in accordance to the attribute signal for a first write policy state and write allocation is always performed in accordance to the attribute signal for a second write policy state, the step of performing write allocation in a selective manner includes the steps of determining if a tag in the cache matches the address of the transaction request;

if the tag does match, then performing write allocation if the attribute signal is in a first state and not performing write allocation if the attribute signal is in a second state; and if the tag does not match, then not performing write allocation regardless of the state of the attribute signal.

2. The method according to claim 1, wherein the step of initiating a write transaction can be initiated from any of a plurality of initiator resources connected to the cache memory, whereby write allocation in the cache memory for the plurality of initiator resources is responsive to the attribute signal and the write allocation policy.

3. The method according to claim 1, further comprising the steps of:

defining a set of address regions within an address space of the back-up memory;

assigning a write allocation attribute bit value to each of at least a portion of the set of address ranges; and wherein the step of providing an attribute signal is responsive to the value of the write allocation attribute bit assigned to an address region that includes the address of the write transaction request.

4. The method according to claim 1, further comprising the steps of:

executing a set of tasks on at least one processor in the digital system;

assigning a write allocation attribute bit value to each of at least a portion of the set of tasks; and wherein the step of providing an attribute signal is responsive to the value of the write allocation attribute bit assigned to a task that initiated the write transaction request.

5. The method according to claim 1, further comprising the step of storing a plurality of write allocation attribute bit values, in a memory management unit (MMU); and wherein the step of providing an attribute signal selects a value for the attribute signal from the plurality of write allocation attribute bit values stored in the MMU.

6. The method according to claim 1, further comprising the step of reestablishing the write allocation policy in a manner that for first write transaction request to a first address the write allocation policy is in a first state and for a second write transaction to the first address the write allocation policy is in a second state.

7. The method according to claim 6, further comprising the steps of:

executing a plurality of program tasks;

performing a context switch between each program task; and wherein the step of reestablishing a write allocation policy is performed during the context switch step.

8. A digital system comprising:

an initiator resource connected to a storage resource, the initiator resource operable to provide a write transfer request to the storage resource and an attribute signal;

a cache memory connected to the storage resource, the cache memory including a tag associated with each cached address;

write allocation policy circuitry connected to the cache memory providing either a first write allocation policy signal or a second write allocation policy signal; and attribute circuitry connected to provide a write allocation signal to the cache memory with each write transfer request, wherein for each write transfer request the cache memory is operable to perform write allocation in a manner in accordance with both the attribute signal and the write allocation policy signal such that write allocation is performed in a selective manner in accordance to the attribute signal for a first write policy state and write allocation is always performed in accordance to the attribute signal for a second write policy state, performing write allocation in a selective manner includes determining if a tag in the cache matches the address of the transaction request;

if the tag does match, then performing write allocation if the attribute signal is in a first state and not performing write allocation if the attribute signal is in a second state; and if the tag does not match, then not performing write allocation regardless of the state of the attribute signal.

9. The digital system according to claim 8, further comprising a plurality of initiator resources each having separate attribute circuitry connected to the cache memory; and wherein for each write transfer request from the plurality of initiator resources the cache memory is operable to perform write allocation in a selective manner in response to the write allocate policy signal.

10. The digital system according to claim 9, wherein the cache memory is responsive to the write allocation policy signal such that write allocation is performed in a selective manner in accordance to the attribute signal for a first write allocation policy state and write allocation is always performed in accordance to the attribute signal for a second write allocation policy state.

11. The digital system according to any of claim 10 being a personal digital assistant, further comprising:

a display, connected to the initiator resource via a display adapter;

radio frequency (RF) circuitry connected to the initiator resource; and an aerial connected to the RF circuitry.

* * * * *